United States Patent [19]

Ottaviano

[11] 4,109,040

[45] Aug. 22, 1978

[54] CUSHIONING DUNNAGE PRODUCT PRODUCED FROM CUSHIONING DUNNAGE MECHANISM

[75] Inventor: Gary W. Ottaviano, Bedford Heights, Ohio

[73] Assignee: Ranpak Corporation, Eastlake, Ohio

[21] Appl. No.: 743,704

[22] Filed: Nov. 22, 1976

Related U.S. Application Data

[62] Division of Ser. No. 573,615, May 1, 1975, Pat. No. 3,923,048.

[51] Int. Cl.² .................................................. B32B 3/04

[52] U.S. Cl. ........................................ 428/129; 93/1 F; 93/1 WZ; 428/194; 428/201; 428/535

[58] Field of Search ............... 428/126, 127, 128, 129, 428/194, 535, 537, 201; 93/1 F, 1 H, 1 WZ, 8 W, 20, 82, 84 R

[56] References Cited

U.S. PATENT DOCUMENTS

| | | | |
|---|---|---|---|
| 1,497,189 | 6/1924 | Mitchell | 428/129 |
| 1,606,307 | 11/1926 | Loomis et al. | 428/535 X |
| 3,063,885 | 11/1962 | Kieffer | 428/129 |
| 3,655,500 | 4/1972 | Johnson | 428/126 |

*Primary Examiner*—James F. Coan
*Attorney, Agent, or Firm*—Baldwin, Egan, Walling & Fetzer

[57] ABSTRACT

A cushioning dunnage product produceable from a mechanism which is of relatively compact nature utilizing a roll of sheet-like stock material, such as paper. As the stock is pulled off the roll, the edges are rolled inwardly in a longitudinally convergent chute, into generally superimposed condition. Pusher means urges the sheet-like stock material laterally toward a confronting surface of the chute. Then the inwardly rolled stock is passed into a crumpler section where mechanism attach together the confronting portions of the rolled edges of the stock material generally centrally, in a direction lengthwise thereof, to retain the dunnage product in highly compressible, lightweight pad-like form. A transfer vehicle is adapted to coact with the dunnage producing mechanism for storing a preselected amount of the pad-like dunnage product on the vehicle, whereupon the vehicle can be moved to a location distant from the dunnage producing mechanism for use at the distant location.

5 Claims, 21 Drawing Figures

CUSHIONING DUNNAGE PRODUCT PRODUCED FROM CUSHIONING DUNNAGE MECHANISM

This is a divisional patent application of copending application Ser. No. 573,615 filed May 1, 1975 now U.S. Pat. No. 3,923,048.

This invention relates in general to a cushioning dunnage product for use as packing material or cushioning dunnage as it is known in the art, and more particularly to a cushioning dunnage product produceable from a relatively compact dunnage producing mechanism resulting in the production of a continuous, highly resilient, pad-like dunnage product from sheet-like stock material. A transfer vehicle or cart is usable in conjunction with the dunnage producing mechanism for transferring preselected amounts of the pad-like dunnage to locations distant from the dunnage producing machine.

BACKGROUND OF THE INVENTION

In U.S. Pat. No. 3,799,039 issued Mar. 26, 1974 to George R. Johnson and entitled "Cushioning Dunnage Mechanism and Method" there is disclosed a cushioning dunnage producing mechanism of a somewhat similar type as that used to produce the present invention. While such prior art mechanism represented a considerable improvement over previous prior art arrangements for producing cushioning dunnage, there were still problems involved in the use of the machine illustrated in such patent. One of the problems was the tendency of the sheet-like stock material to tear during the dunnage producing operation and during its movement from a composite roll of the stock material into the crumpler section of the machine. Tearing of the stock material generally necessitated shutting down of the machine and reinserting non-torn portions of the webs from the stock roll into the crumpler mechanism, so that a high quality dunnage pad could be produced in the mechanism. Moreover, with the arrangement disclosed in the U.S. Pat. No. 3,799,039, the dunnage material produced was generally used at the location of or in the immediate vicinity of the dunnage producing machine, and the transfer of the dunnage pad material to another location was not too convenient.

SUMMARY OF THE INVENTION

The present invention provides a novel cushioning dunnage product produced from sheet-like stock material, such as paper. Moreover, the invention provides a cushioning dunnage product which may be produced on a mechanism of the aforedescribed type including a transfer vehicle for use in conjunction with the dunnage producing machine, for expeditiously providing for transfer of a preselected amount of the pad-like dunnage material from the location of the machine to a location distant from the dunnage producing machine, and in a manner wherein the dunnage pad material may be expeditiously transferred from the producing machine to the transfer vehicle.

Accordingly, an object of the invention is to provide a novel cushioning dunnage product in strip form for use as dunnage packing material.

Another object of the invention is to provide a cushioning dunnage product produceable on a mechanism of the type which utilizes a multi-ply roll of stock material rotatably mounted on the mechanism.

Another object of the invention is to provide a transfer vehicle in conjunction with a mechanism of the above type for transferring selected amounts of the dunnage pad produced from the machine to a location distant from the machine, in an expeditious manner.

A still further object of the invention is to provide a dunnage product produceable on a mechanism in accordance with the above which mechanism includes a convergent chute for funneling the webs of stock material from the roll to a crumpler section on the mechanism, and wherein the axis of rotation of the roll of stock material is so disposed that the peripheral extremity of the mounted roll is substantially no lower or laterally disposed than a longitudinal plane passing through an inner defining surface of the chute at the entrance to the chute.

Another object of the invention is to provide a pad-like dunnage product produceable on a mechanism of the above described type including a transfer vehicle which includes means thereon for selectively cutting the dunnage product carried thereon into selected lengths at the location of use.

Further objects and advantages of the invention will be apparent from the following description taken in conjunction with the accompanying drawings wherein:

DESCRIPTION OF THE PREFERRED EMBODIMENTS

Figure 1:
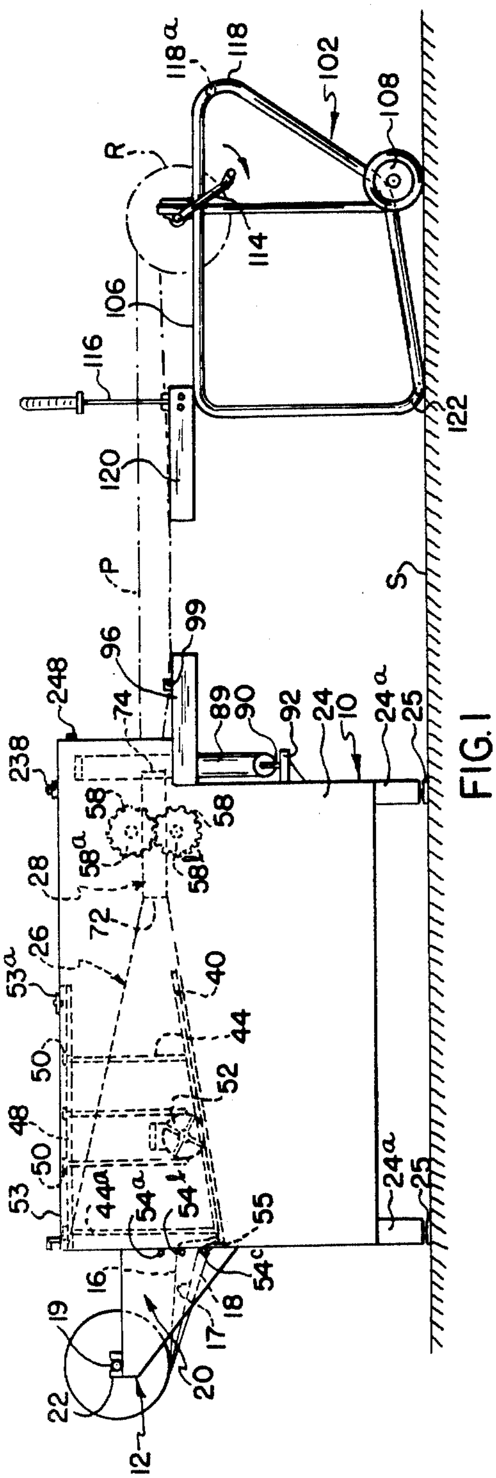
FIG. 1 is a somewhat diagrammatic side elevational view of a mechanism adapted to produce the dunnage product of the present invention, and including a transfer cart or vehicle.

Referring now again to the drawings, there is illustrated a dunnage producing machine 10 which utilizes a single multi-ply stock roll 12 of sheet-like material such as, for instance, Kraft paper. In the embodiment illustrated, the stock roll 12 comprises a hollow core 14 of generally cylindrical configuration on which are rolled three superimposed webs or runs 16, 17 and 18 of paper stock material. The roll of stock material is adapted to be mounted on a supporting rod 19 extending through core 14, for rotation of roll 12 relative to the support structure 20, as the paper stock is drawn into the dunnage machine 10.

Open top, standing U-shaped guides 22 are provided, in the embodiment illustrated, for generally loosely receiving the ends of the rod 19 and retain the rod on the support structure 20 while providing for rapid replacement of the stock roll when necessary. In the embodiment illustrated, the three superimposed webs 16, 17 and 18 of paper stock are of generally equal width. As an example, the elongated roll of stock material may be of a dimension of approximately 9 inches in diameter by approximately 28 to 30 inches in width. However, as will be hereinafter discussed, the diameter of the roll is not particularly important so far as operation of the machine is concerned. What is important is the location of the periphery of the roll as related to the entranceway to the chute of the mechanism, in order to aid in preventing tearing of the sheets of stock as they come off the roll, and as will be hereinafter discussed. One end of the rod 19 extending through the stock roll, is adapted to have an opening therethrough receiving a pin projecting laterally from the rod, for preventing rotation of the rod upon rotation of the roll about rod 19. In other words, the roll of stock frictionally rotates relative to the rod 19 during pulling of the stock material into the dunnage producing mechanism in the embodiment illustrated.

Machine 10 comprises, in the embodiment illustrated, a support frame 24, including leg portions 24*a* which preferably include means 25 associated therewith for leveling the support frame with respect to the supporting surface S.

Frame 24 supports a longitudinally converging chute 26 (FIGS. 1, 9 and 10) which chute forms a guide and support for the webs of stock material 16, 17 and 18 as they are drawn off the stock roll 12 and are passed to a longitudinally elongated crumpler section 28 of the dunnage producing machine. In the embodiment illustrated, the chute 26 and the crumpler section 28 may be provided as an integral unit which can be conveniently formed of, for instance, fiberglass or plastic or some other such suitable material.

Figure 2:
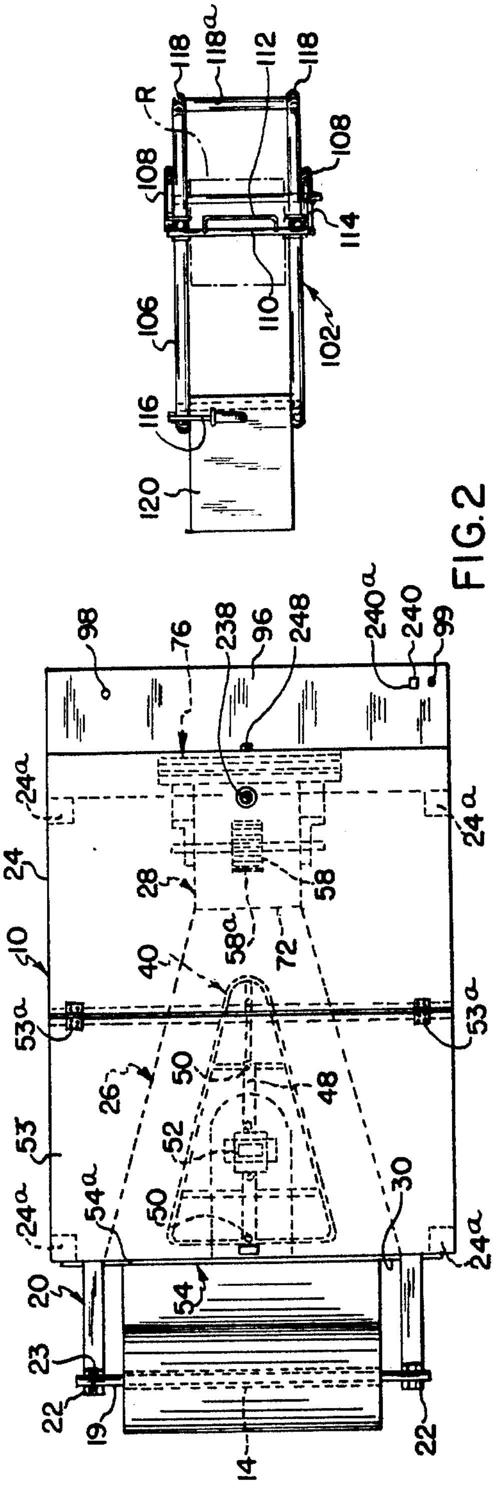
FIG. 2 is a top plan view of the mechanism of FIG. 1.
Figure 3:
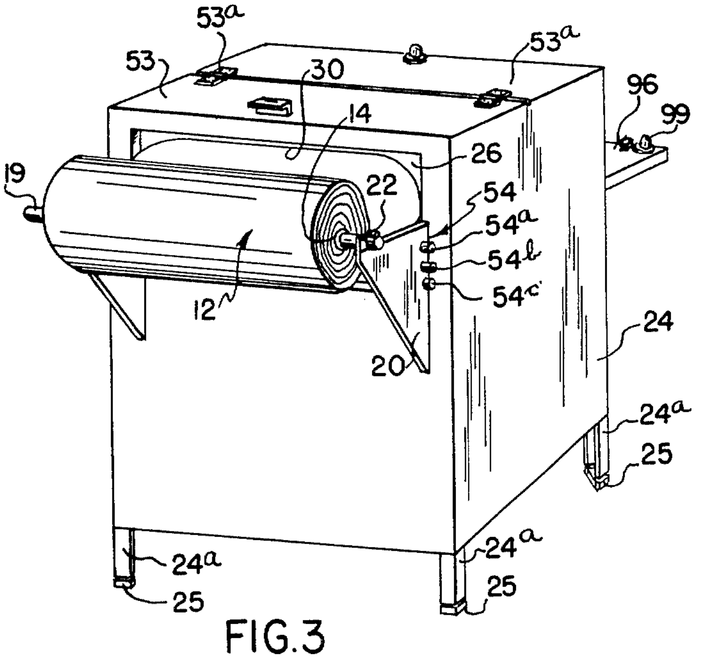
FIG. 3 is a generally perspective view of the dunnage producing machine of FIGS. 1 and 2 taken from the rear thereof.
Figure 3A:
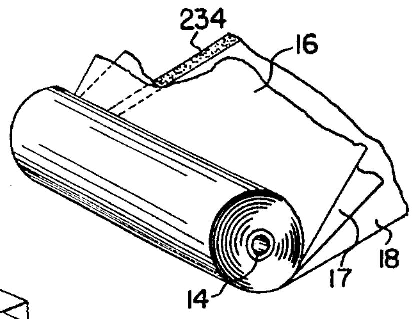
FIG. 3A is a fragmentary view of a stock roll embodying adhesive means on at least certain of the webs or sheets of stock material for securing the confronting portions of the rolled edges of the stock material together for maintaining the pad-like configuration of the finished dunnage product.
Figure 9:
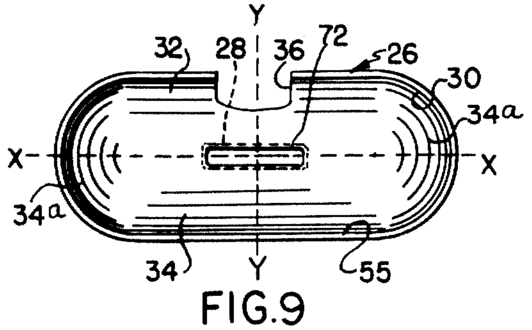
FIGS. 9 and 10 are respectively front elevational and top plan view of the chute of the machine.
Figure 10:
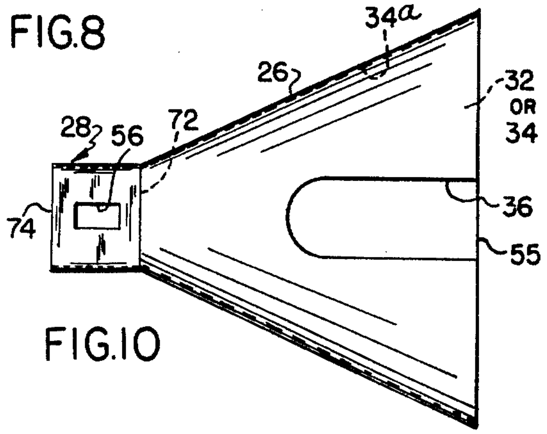
Figure 11:
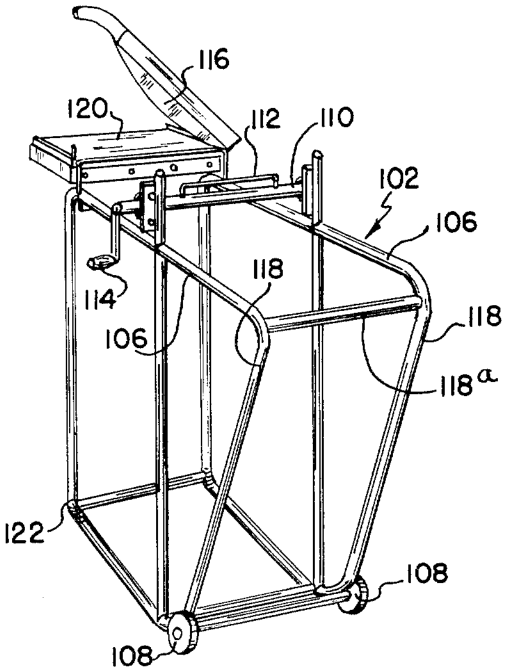
FIGS. 11 and 12 are perspective views of the transfer vehicle or cart adapted for use in conjunction with the dunnage producing machine, for receiving the pad-like dunnage product from the continuous production on the machine, storing or supporting on same on the transfer vehicle, and providing for subsequent transfer of the preselected amount of the dunnage pad material to an area or location distant from the area of production of the dunnage producing machine.
Figure 12:
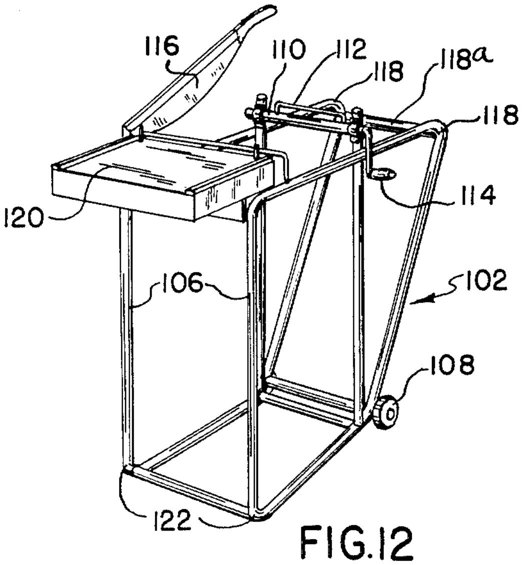
Figure 14:
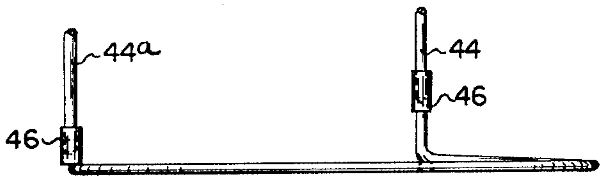
FIG. 14 is an elevational view of the FIG. 13 structure.

As can be best seen in FIGS. 1, 2 and 9, the chute section 26 comprises a widened mouth or entranceway 30, with the upper, lower and side wall interior surfaces 32, 34, 34*a* (FIG. 2) of the chute converging rearwardly with respect to one another and with respect to the entranceway. Entranceway 30 is of generally oval configuration (FIG. 9), with the major axis X—X of the oval shape disposed in a generally horizontal plane which passes through the horizontal center plane of the crumpler section 28. The minor axis Y—Y of the oval shaped entranceway is disposed in a vertical plane passing through the longitudinal center axis of the crumpler section 28. The top wall of the chute may be recessed as at 36 (FIGS. 2, 9 and 10) for providing accessibility to a pusher mechanism 40 (FIGS. 1, 14 and 15) which extends downwardly in depending relation from the top of the support frame to be closely spaced to the bottom wall surface 34 of the chute and as can be best seen in FIG. 1.

Figure 13:
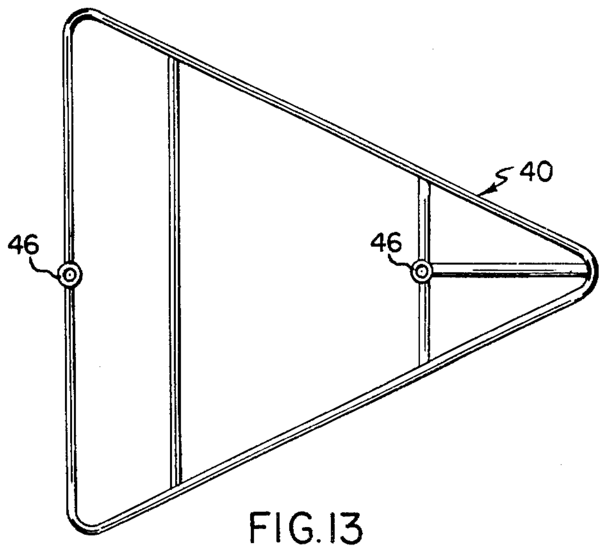
FIG. 13 is an enlarged top plan detailed view of pusher mechanism for mounting in the chute of the dunnage producing mechanism of FIGS. 1 and 2.

Pusher mechanism 40 in the embodiment illustrated comprises a tubular body portion of generally triangular shape in plan (FIG. 13) and is supported in the chute 26 in relatively closely spaced relation to the bottom interior surface 34 thereof by front and rear threaded rods 44, 44*a* extending through recess 36 in the chute. Threaded sockets 46 are provided on the body portion of the pusher mechanism, which receive one end of the associated rod 44 or 44*a*.

The other end of the rod extends through a support bar 48 (FIG. 2) and is secured to the bar 48 as by means of associated nuts 50. A plurality of longitudinally spaced openings may be provided in the bar 48 for selective adjusting of the position of the pusher with respect to the chute 46. It will also be seen that the nuts 50 provide for adjustment for the relative closeness of the body portion of the pusher with respect to the confronting surface 34 of the chute.

As can be seen in FIG. 2, the body portion of the pusher occupies a substantial portion of the crosswise dimension of the bottom wall of the chute, and causes the sheet-like stock material as it passes from the stock roll 12 to the crumpler section 28 to be generally confromed to the chute, thereby causing effective inward rolling of the lateral edges of the webs of stock material.

The body portion of the pusher means being formed of rod or tube material has rounded edges, and as it receives the stock material there beneath, urges it downwardly toward the bottom wall of the chute and aids in preventing tearing of the webs of stock material coming off stock roll 12.

A wheeled counting mechanism 52 may be provided, supported as by means of the aforementioned bar 48, for determining the amount or linear footage of dunnage material produced by the dunnage machine. A top cover 53, which may be hinged as at 53*a* provides convenient access to the interior of the machine and to the pusher mechanism 40 and counting mechanism 52.

Mounted on the frame 24 downstream from the rotational mounting 19 of the stock roll 12 is a separating means 54 (FIG. 1). In the embodiment illustrated separating means 54 comprises a plurality of vertically spaced bar-like elements 54*a*, 54*b*, and 54*c*, through which is adapted to pass the webs from the stock roll 12.

As can be seen from FIG. 1, the upper web 16 is adapted to pass beneath separator rod 54*a*, while the middle web 17 passes beneath the separator rod 54*b*, and the lower web 18 passes beneath the lower separator rod 54*c*.

The separator mechanism maintains the webs in separated condition prior to their being urged back into generally juxtaposed condition at the pusher mechanism 40, the latter being downstream from the preferably cylindrical separator rods. The lowermost rod 54*c* is disposed just slightly above the bottom periphery of the entranceway 30 to chute 26, and with sufficient clearance so as to permit ready entry of the stock web 18 therebeneath.

In accordance with the invention, the axis of rotation of the stock roll is so positioned that the periphery of the stock roll 12 as initially loaded on the machine is maintained substantially no lower than and preferably higher than a horizontal plane passing through the aforementioned entranceway bottom periphery 55 to the chute 26. Such positioning of the stock roll periphery aids in preventing tearing of the webs of stock material as they are pulled off the stock roll and are directed toward the crumpler section 28.

Figure 5:
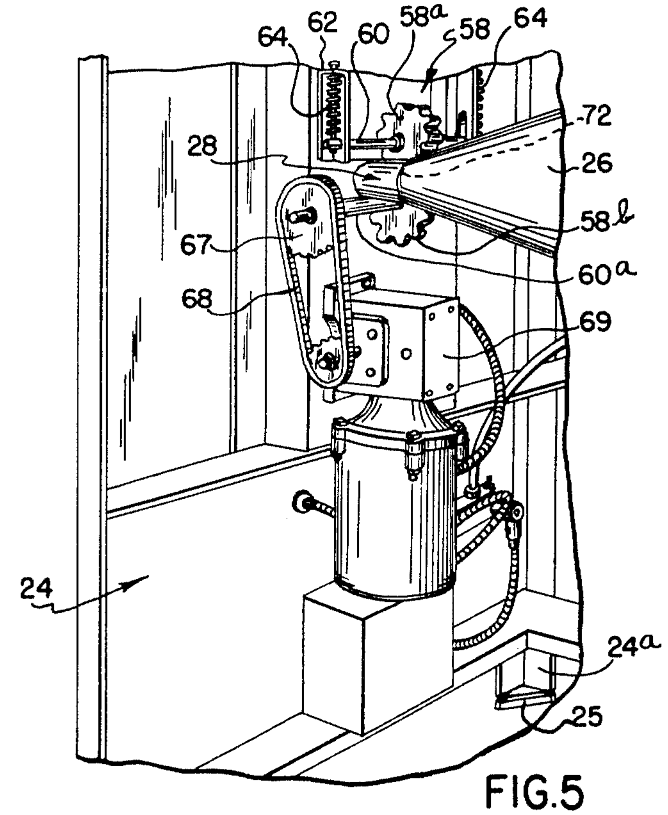
FIG. 5 is a fragmentary detailed view of the crumpler portion of the dunnage producing mechanism, together with power operated gears for uplling the stock material through the dunnage producing machine and for joining or stitching the superimposed inwardly rolled edges of the stock material into an integral pad-like product.
Figure 6:
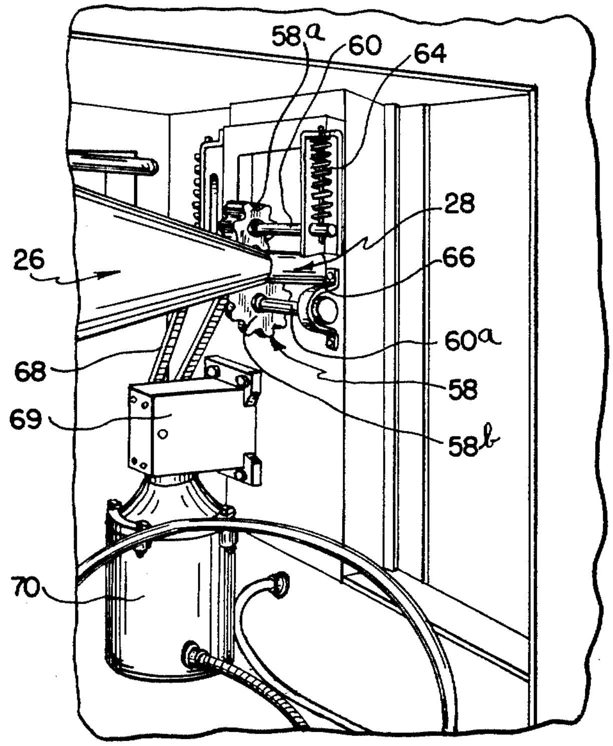
FIG. 6 is a view taken from the opposite side of the mechanism illustrated in FIG. 5.

Crumpler section 28 preferably has slots 56 (FIG. 10) in its upper and lower walls into which extend connecting or stitching means 58 (FIGS. 5 and 6) for connecting confronting portions of the generally loosely crumpled stock material together as the latter is drawn through the crumpler section by the connecting means. In this connection, the connecting means comprises in the FIGS. 5 and 6 embodiment, generally loosely meshed equal size spur gears 58*a*, 58*b* which are rotatably mounted as by means of a respective shaft 60, 60*a*, for rotation relative to the crumpler section 28. Shaft 60 of upper gear 58*a* is preferably arranged so that the ends of the shaft are mounted in a slotted bracket frame 62 (FIG. 5) with the ends of the shaft being spring loaded as at 64, for urging the shaft downwardly toward the underlying gear 58*b*. It will be seen, therefore, that the top gear 58*a* generally "floats" in its supporting slotted bracket structure 62, with the gear 58*a* being movable vertically relative to the underlying gear 58*b*, to thus provide for tension varying of the spacing between the gears as different amounts or thicknesses of material pass therebetween. Such an arrangement aids in preventing tearing of the stock material due to too hard meshing between the connecting gears.

The lower shaft 60*a* may be rotatably mounted in stationary bearing structure 66 (FIG. 6) and includes a sprocket 67 secured to one end thereof, which in turn is connected by endless chain or belt 68 to geared speed reducer 69, the latter being driven by an electric motor 70 mounted on the machine frame 24. It will be seen that actuation of the motor 70 will cause rotation of the meshed gears 58*a*, 58*b* thus not only coining the stock material by rotation of the gears but also pulling the crumpled stock material through the mechanism.

The lateral edges of the webs 16, 17 and 18 of the stock roll after they pass the transversely extending separating rods 54*a*, 54*b* and 54*c* commence to be turned inwardly by the curved walls of the chute 26. Thus when the rolled edges of the webs reach the narrowed entrance mouth 72 of the crumpler section 28, they have been rolled substantially inwardly into generally abutting confronting relation with one another and wherein the web stock material is crumpled radially inwardly by the crumpler section and then is coined or joined along the central portion thereof by the aforementioned meshing gears 58*a*, 58*b*.

The webs 16, 17 and 18 are pulled from the periphery of the stock roll 12 in a zone defined by the aforementioned horizontal plane passing through chute entrance periphery 55 and a horizontal plane passing generally through or at the core tube 14 of the stock roll. It will be seen that at least initially when the stock roll is the heaviest, the periphery of the roll will in general be disposed in confronting relation to a zone defined by longitudinal planes passing through the uppermost separating rod 54*a* and the aforementioned chute entrance periphery 55. After considerable depletion of the stock roll and therefore considerable lightening thereof the periphery thereof in the embodiment illustrated, will move above a horizontal plane passing through the separating rod 54*a*.

The aforementioned pushing mechanism 40 urges the webs of stock material into engagement with one another during the inward rolling of the lateral edges of the webs, and aids in maintaining alignment of the stock material in its movement toward the crumpler section 28.

Figure 4:
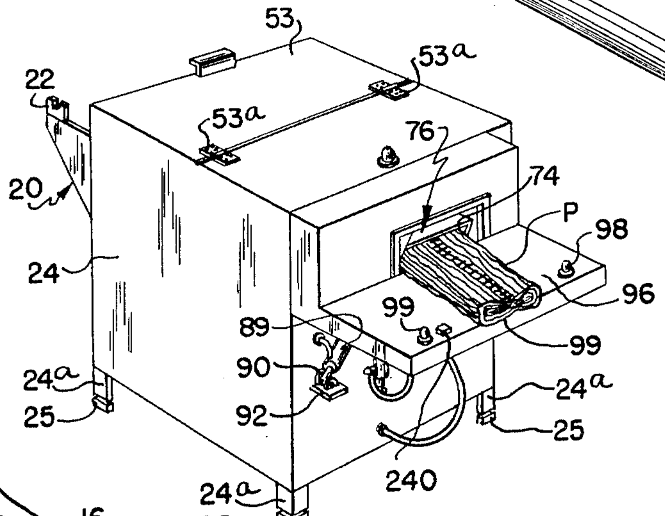
FIG. 4 is a perspective view of the dunnage producing machine of FIGS. 1 and 2 taken generally from the front thereof.
Figure 3B:
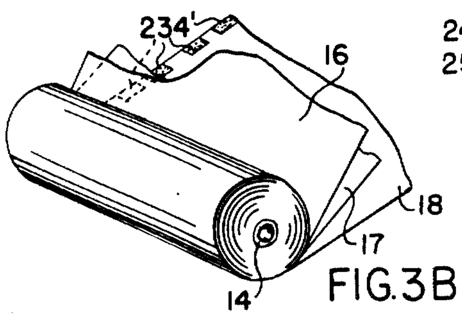
FIG. 3B is a fragmentary view similar to FIG. 3A but illustrating a modified arrangement.

After passing from the exit opening 74 of the crumpler section 28, the continuously formed pad P (FIG. 4) of stock material may be severed by the cutter mechanism 76 mounted on the rear end of the machine at the exit opening 74 therein.

Cutter mechanism 76, in the embodiment illustrated, comprises a cutter framework 78 (FIG. 7) in which is movably mounted a cutter blade 78*a* which has a sharpened, preferably replaceable edge 79 adapted for cutting coaction with a stationary cutter edge 78*b* on the upper cross piece 80 of the cutter frame. Cutter frame 78 includes side leg portions 82, 84, each of which is of hollow construction (FIG. 8) and embodying a guideway or track 82*a* or 84*a* (FIG. 8) adapted to receive guide means 86 (in the embodiment illustrated rotatable wheels) on the cutter blade 78*a* for guiding the movement of the cutter blade 78*a* relative to the cutter frame 78. The wheels 86 are rotatably mounted on and with respect to the blade 78*a* and are received in rolling relation in the respective guide track 82*a* or 84*a* in the respective leg of the cutter frame 76.

Figure 7:
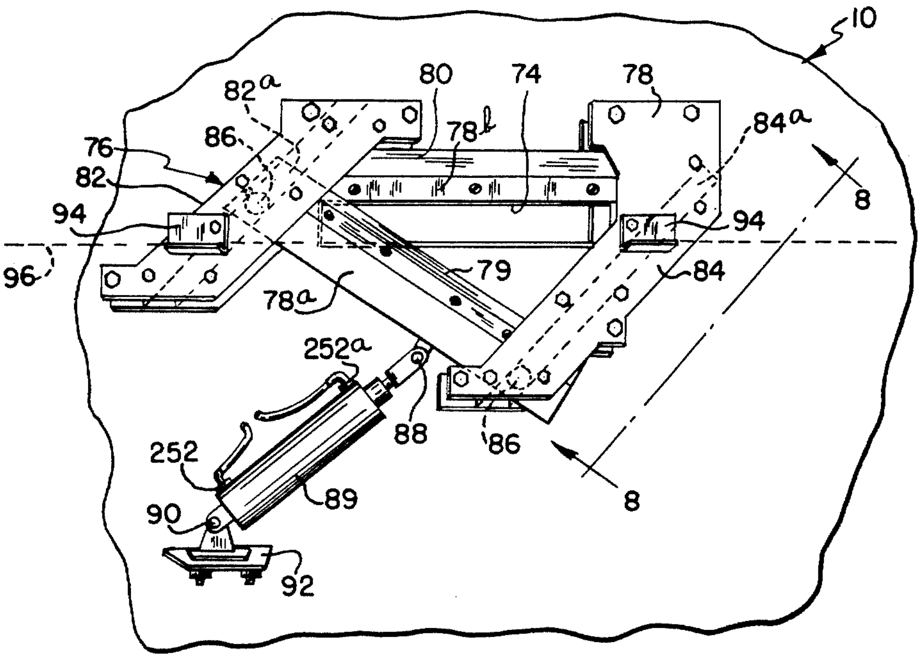
FIGS. 7 and 8 are respectively front and side elevational views of cutting mechanism utilizable in the dunnage producing machine, for cutting the dunnage product produced on the machine.
Figure 8:
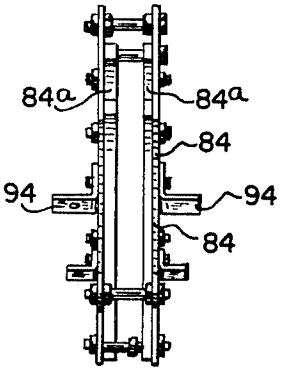

Cutter blade 78*a* is pivotally coupled at 88 to a reciprocal double acting fluid powered motor unit 89 (FIG. 7) with the pivotal connection of the motor unit to the blade being offset in a direction toward the longer leg portion 84 of the cutter frame 78, and as can be best seen in FIG. 7. The other end of the motor unit 89 is pivoted as at 90 to a bracket 92 mounted on the support frame for the dunnage machine. Brackets 94 on the cutter frame locate and aid in supporting table surface 96, on which the pad-like dunnage may be supported as it is emitted by the mechanism.

Motor unit 89 is adapted to be controlled in its reciprocal actuation by means of a pair of control buttons 98, 99 mounted on the table surface 96 extending rearwardly from the frame of the dunnage machine. By having two control buttons in order to cause actuation of the cutter unit 76, both hands of the operator are maintained exteriorly of the cutter unit and protected from injury during actuation of the cutter unit.

In accordance with the invention, transfer vehicle 102 is provided, for receiving a predetermined amount of dunnage pad from the dunnage machine, winding it into a roll R (FIG. 1) and supporting it on the vehicle for subsequent transfer to an area distant from the dunnage machine 10.

The transfer vehicle 102 comprises a preferably lightweight frame 106 which has wheels 108 rotatably mounted thereon, for making the frame readily movable, and which may include a rotatable shaft 110 having some means thereon for initially securing the end of a strip of dunnage pad material thereto, during rotation of the shaft 110. Such means in the embodiment illustrated comprises a U-shaped bracket 112 attached to and projecting laterally from the shaft and which is adapted to receive the free end of the dunnage pad being produced by the machine and hold it during rotation of the shaft 110, as by means of removable handle 114. When the roll of dunnage material collected is of desired size, then either the cutter mechanism 76 on the dunnage machine, or the cutter 116 on the transfer cart, can be actuated to cut off the pad from the continuous length being produced by the dunnage machine, and the roll of dunnage material on the transfer cart is then available for expeditious movement by means of the transfer cart, to a selected area which may be distant from the dunnage machine.

When the cart or transfer vehicle 102 is moved to the desired location the manually operable cutter blade 116 can be utilized to cut the dunnage roll R into the desired lengths at the area to which the cart has been transported to. The transfer cart preferably has diagonally extending hand gripping portions 118 and cross portion 118*a* for gripping by a workman, and for tipping the cart rearwardly so that it is supported on the wheels 108, for easy movement. The other end of the cart with the cutter mechanism 116 and associated support board 120 thereon is of such weight that upon release of the handle portions 118, said other end of the cart tips downwardly by gravity and is supported by the end 112 (FIG. 1) of the frame portion 106 of the cart.

It will be seen therefore, that with the transfer cart, the production of the dunnage pad P from the dunnage machine can be used much more expeditiously, by providing an arrangement for rapidly receiving a selected amount of the dunnage pad from the producing machine and facilitating movement of such selected amount to an area which is remote from the machine, thus enabling the dunnage pad product to be utilized in various areas of an establishment without the necessity of having a dunnage producing machine located at each area wherein use of dunnage is desired.

Figure 16:
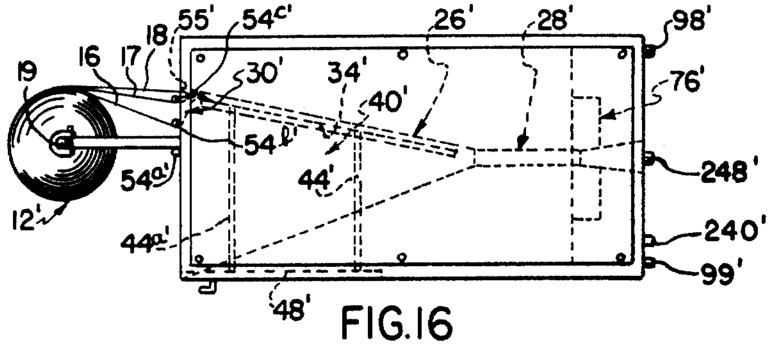
FIG. 16 is a top plan view of a modified arrangement of dunnage producing machine.
Figure 17:
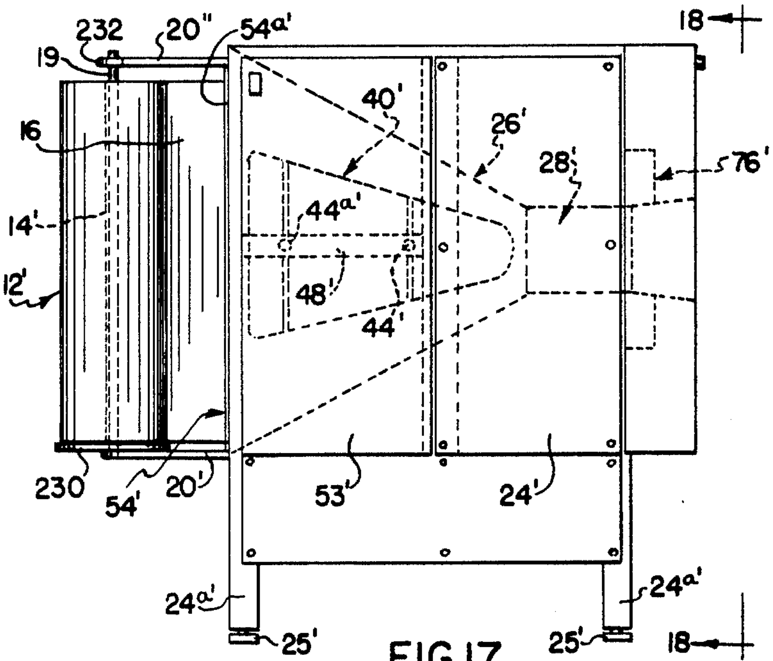
FIG. 17 is a side elevational view of the FIG. 16 machine.
Figure 18:
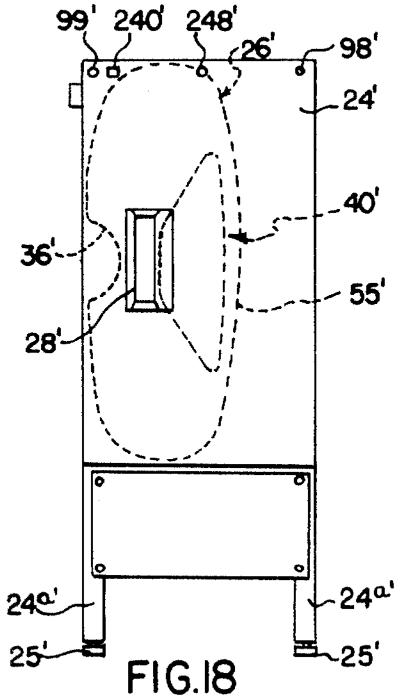
FIG. 18 is an end elevational view taken generally along the plane of line 18—18 of FIG. 17.

Referring now to FIGS. 16, 17 and 18 there is illustrated another embodiment of the dunnage machine which is of a more compact nature in a horizontal or width direction as compared to the first described embodiment. In this arrangement, the stock roll 12' is mounted for rotation about a vertical axis, with the lower end of the shaft 19' which extends through the hollow core tube 14' of the stock roll, being received in a complementary opening in turntable 230, which is rotatably mounted on bracket structure 20' for rotation about a generally vertical axis, the latter being coincident with the axis of the rod 19'.

The upper end of the rod 19' is received in supported and preferably clamped relation by means of suitable readily releaseable clamping means 232, mounted on upper support 20'', so that the stock roll 12' can be rapidly mounted on the turntable and clamped by clamping mechanism 232, for rotary movement.

The webs 18, 17 and 16 coming from the stock roll 12', pass through the divider means 30' in a generally similar manner as in the first described embodiment, except that the webs are generally vertically oriented as compared to being generally horizontally oriented as in the first described embodiment.

Divider means 30' comprises vertically oriented rods 54*a*', 54*b*', 54*c*' coacting to cause separation of the webs 16, 17 and 18 from the stock roll, in a generally similar manner as in the first described embodiment. The chute means 26 in this embodiment may be of the same structural arrangement as in the first described embodiment, except that it is tipped on its side so that the major axis X—X of the oval shaped mouth or entranceway 30' to the chute means 26' is vertically disposed as compared to the horizontal orientation of the first described embodiment.

It will be seen that the separating rod 54*c*' coacts with the adjacent surface 34' of the chute means in the same general way that the rod 54*c* coacts with the corresponding surface 34 of the chute of the first described embodiment, and also that the periphery of the stock roll 12' is oriented with respect to a longitudinal plane passing through the surface 34' of the chute means of this embodiment in a similar relationship as in the first described embodiment.

A pusher mechanism 40' may coact with surface 34' in a similar manner as in the first described embodiment, and the webbed stock material from the stock roll passes beneath the pusher and into the crumpler section 28', where it is radially inwardly compressed in a similar manner as in the first described embodiment, to produce a pad-like dunnage product at the emitting end of the mechanism.

A cutter mechanism 76' may be mounted at the emitting end or mouth 74' of the dunnage mechanism, for cutting the dunnage material into selected lengths. In most other respects, the FIGS. 16, 17 and 18 embodiment is generally similar to the first described embodiment, with similar reference numbers being utilized to designate similar parts with the addition of the suffix (') prime thereto.

It will be seen that one of the advantages of the FIGS. 16, 17 and 18 embodiment is that it utilizes much less floor space for a dunnage machine, and while the dunnage product comes out of the machine tipped generally on its side as compared to that in the first described embodiment, it (the product, since it is very flexible) can be turned for coaction with a transfer cart (not shown) in a similar manner as that utilized in the first described embodiment.

Figure 19:
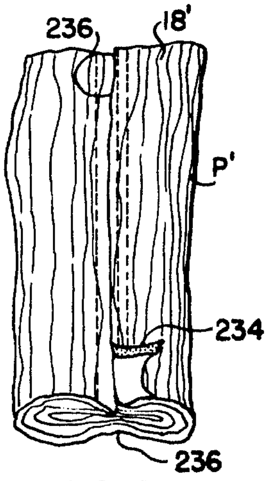
FIG. 19 is a fragmentary view of the pad-like dunnage product produced on a dunnage machine utilizing for instance a stock roll of FIG. 3A embodying adhesive means for attaching together confronting portions of the exterior sheet of the stock sheet material.

FIG. 19 discloses another embodiment of dunnage product wherein the outer web 18' of the stock material has been provided with a strip 234 of adhesive, such as for instance pressure sensitive adhesive, along at least one lateral edge thereof. Thus when the webs are radially crumpled and placed into generally confronting relationship with one another, the strip 234 of adhesive is used to connect the confronting portions of the inwardly turned or inwardly rolled lateral edges of the stock webs together, to maintain the dunnage product P' in pad-like form. In this connection rather than having meshed gears 58*a* 58*b* coacting with the stock webs for coining or coupling them together, plain rollers or wheels could be utilized for compressing the confronting portions of the web stock material together so that the pressure sensitive adhesive strip 234 will be positively forced into sealing or securing contact with the confronting portion of the web, to hold the dunnage product in the pad-like form illustrated.

It will be seen that if wheel connecting means are used in lieu of the geared means illustrated in the first described embodiment, that the central section 236 of the dunnage product P' will be of a lesser thickness dimension as compared to the lateral pillow like portions of the product, and in a similar manner as the product produced by the geared connecting means, except that the product is held together not by coining of the webs, but instead by the strip of adhesive material. It will be understood, of course, that the geared connecting means could be utilized in conjunction with stock material utilizing adhesive connecting means rather than plain rollers, but with the adhesive strip, it is not necessary to also coin or mechanically stitch the stock material together, to hold it in its pad-like form.

Figure 15:
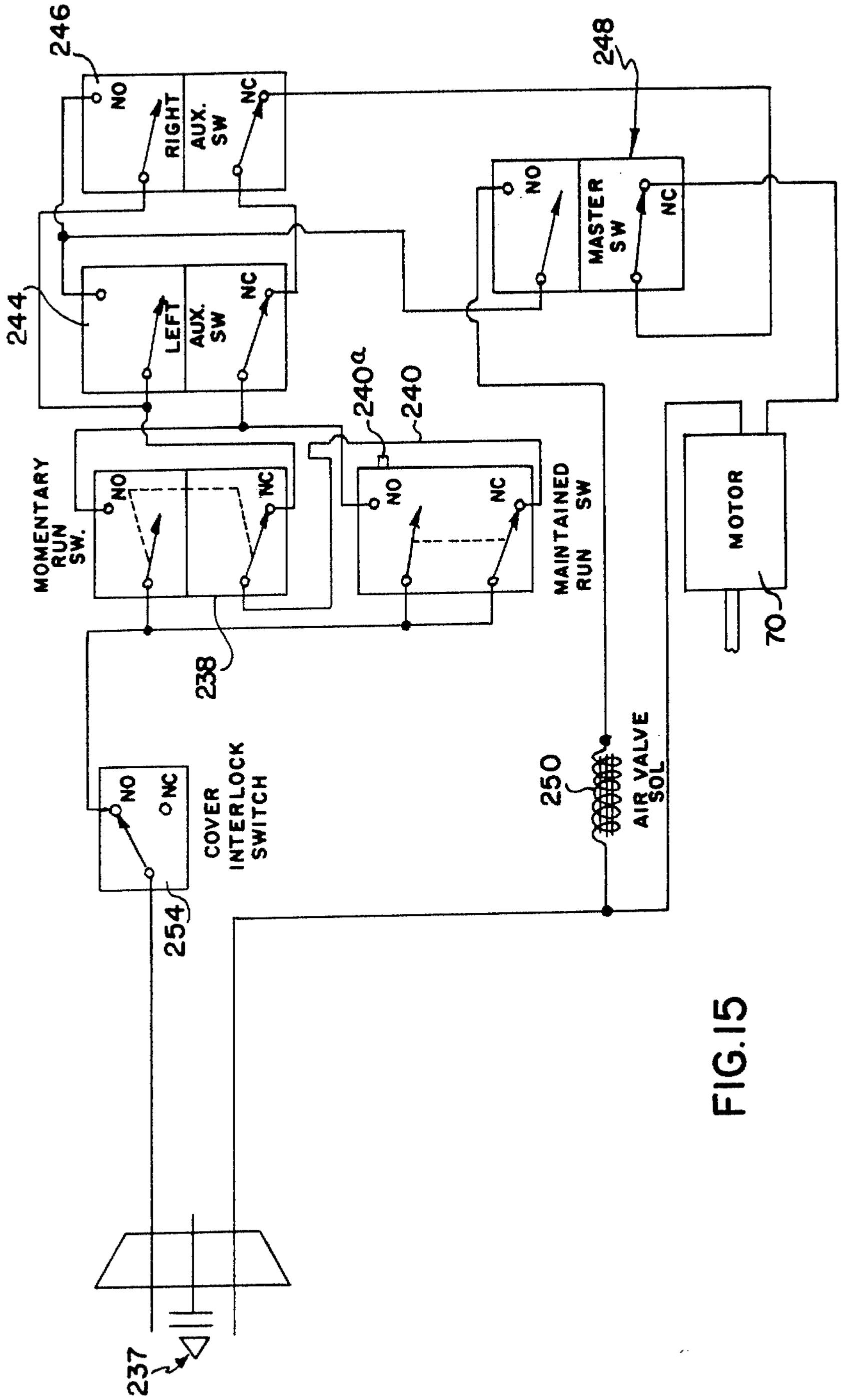
FIG. 15 is a diagrammatic, schematic illustration of a control circuit for the dunnage producing machine.

Referring now to FIG. 15, there is shown schematically, a control system for controlling operation of the dunnage mechanism of either the FIGS. 1 and 2 embodiment or the FIGS. 16, 17 and 18 embodiment. The system is adapted for plugging into a conventional 115 volt AC source 237 of power.

A "momentary run" switch 238 (FIGS. 1, 2 and 13) is provided for momentarily actuating the drive motor 70 of the mechanism so long as the switch is held in compressed condition, for producing a selected amount of cushioning dunnage. Switch 238 is spring loaded and when actuated, the normally open contact thereof closes and the normally closed contact thereof opens, whereby the electric motor 70 is energized from the source of power 237. When the finger of the operator is removed from the switch button, the spring of the switch causes the normally open contact to reopen and the normally closed contact to close, thereby automatically deactuating the motor 70.

There is also provided a "maintained run" switch 240. The maintained run switch 240 is a maintained on-off type switch, so that when the manual actuating button 240*a* for the switch is pushed in one direction, the normally open contact of the switch closes and the normally closed contact opens and such condition is maintained when the finger of the operator is removed from the switch button. When the button 240*a* is repushed, the normally open contact opens, and the normally closed contact is once again closed.

Also located on table surface 96 on opposite sides of the exit mouth 74 of the dunnage machine is a auxiliary left, cutter actuating switch 244, and a auxiliary right hand cutter actuating switch 246, which are arranged in series with a master cutting actuating switch 248. Switch 248 can be disposed generally centrally of the dunnage mechanism above the exit mouth thereof, and as can be seen in FIGS. 1 and 2.

Either the left hand auxiliary switch 244 or the right hand auxiliary switch 246 must be actuated in conjunction with the master switch 248 in order that energization of the fluid actuated motor unit 89 actuating the cutter mechanism 76, can occur. It will be seen upon actuation of master switch 248, the normally open contact is closed and upon actuation of one or the other of the auxiliary cutter switches 244 or 246 the solenoid 250 controlling the flow of actuating fluid, such as for instance pressurized air, to the motor unit 89 is energized, to cause application of pressurized fluid to entry port 252 (FIG. 7) thereby causing outward projection of the piston rod of the motor unit, to cause the cutter blade 78*a* to move in its guided trackways 82*a*, 84*a* into cutting coaction with the upper stationary cutter blade 78*b*, thereby cutting off the dunnage pad at the selected length. Upon release of the actuating button of the auxiliary cutter switch or the button of the master switch, the normally closed contact of the auxiliary switch once again automatically closes, and the normally closed contact of the master switch once again automatically closes, thereby de-energizing the solenoid and the associated air valve automatically applies pressurized air to port 252*a* of motor unit 89, to move the cutter blade 78*a* downwardly along its guide paths whereby the cutter blade 78*a* is disposed in retracted condition.

It will be seen therefore that the both hands of the operator are necessary or occupied in order to actuate the cutter mechanism 76, and therefore such arrangement provides a safety system to insure that the hands of the machine operator can not be located in a position where they could be injured by the cutter mechanism, upon actuation thereof.

A cover interlock switch 254 (FIG. 13) is also preferably provided in the control system to disable the electric power to the machine from the source, in the event that cover 53 (or 53') is not disposed in completely closed condition.

From the foregoing description and accompanying drawings it will be seen that the invention provides a cushioning dunnage product produceable from a dunnage machine and resulting in a relatively low density pad-like cushioning product, and wherein such dunnage can be rapidly and effectively produced by the machine without tearing of the stock material, and wherein the continuously produceable dunnage pad from the machine can be expeditiously stored on a transfer cart for subsequent transfer to areas remote from the dunnage machine.

The terms and expressions which have been used are used as terms of description, and not of limitation, and there is no intention, in the use of such terms and expressions, of excluding any equivalents of the features shown and described, or portions thereof, but it is recognized that various modifications are possible within the scope of the invention claimed.

What is claimed is:

1. A machine produced lightweight compressible flexible cushioning dunnage product of pad-like configuration formed from a plurality of superimposed webs of separate paper sheets, the lateral edges of which have been rolled loosely inwardly into generally abutting relation, and then crumpled generally radially inwardly, and comprising a central compressed section running lengthwise for the length of the product and lateral pillow-like sections, and pressure sensitive adhesive means formed integral on the outermost web initially adjacent a lateral edge thereof and coacting therewith in said central section of said product for aiding in maintaining said abutting relation in said central section, for retaining the product in said pad-like form.

2. A dunnage product in accordance with claim 1 wherein said adhesive means comprises a continuous strip of pressure sensitive adhesive.

3. A dunnage product in accordance with claim 1 wherein said adhesive is a pressure sensitive adhesive requiring predetermined pressure to cause adhesion between the adhesive and an adjacent coacting abutting section of the product.

4. A dunnage product in accordance with claim 1 wherein said adhesive means comprises spaced generally aligned areas of pressure sensitive adhesive.

5. A dunnage product in accordance with claim 1 wherein said central section is coined by spaced generally meshing gear means which additionally aids in maintaining said product in said pad-like form, said coined central section comprising interengaged coined portions of said paper sheets along said adhesive retained abutment thereof, said laterally arranged pillow-like sections of said product each being of a greater thickness than said central compressed section.

* * * * *